United States Patent [19]

Bisa et al.

[11] 4,136,024

[45] Jan. 23, 1979

[54] AEROSOL DISPERSION OF MICROORGANISMS TO ELIMINATE OIL SLICKS

[76] Inventors: Karl Bisa; Thomas Bisa, both of Am Wilzenberg 32, 5949 Grafschaft, Germany

[21] Appl. No.: 871,788

[22] Filed: Jan. 24, 1978

Related U.S. Application Data

[63] Continuation-in-part of Ser. No. 723,622, Sep. 14, 1976, abandoned, which is a continuation-in-part of Ser. No. 581,547, May 29, 1975, abandoned.

[30] Foreign Application Priority Data

Feb. 17, 1975 [DE] Fed. Rep. of Germany ....... 2506612

[51] Int. Cl.$^2$ ............................ C02C 1/02; C02C 5/10
[52] U.S. Cl. ......................................... 210/11; 210/17; 210/18; 210/DIG. 27; 195/3 H; 195/28 R; 204/149; 204/180 R
[58] Field of Search ................. 210/2, 11, 17, 18, 150, 210/151, DIG. 27; 195/3 H, 28 R, 51 R, 104; 204/149, 180 R, 195 B; 222/136, 193; 239/171, 427.3

[56] References Cited

U.S. PATENT DOCUMENTS

| | | | |
|---|---|---|---|
| 3,069,325 | 12/1962 | Hitzman | 195/3 H |
| 3,131,131 | 4/1964 | Wehner | 195/51 R |
| 3,522,147 | 7/1970 | Filosa | 195/3 H |
| 3,616,204 | 10/1971 | Linn | 195/3 H |
| 3,728,279 | 4/1973 | Salomone | 195/34 |
| 3,769,164 | 10/1973 | Azarowicz | 195/28 R |
| 3,843,517 | 10/1974 | McKinney | 210/21 P |
| 3,856,667 | 12/1974 | Azarowicz | 210/11 |
| 3,870,599 | 3/1975 | Azarowicz | 195/28 R |
| 3,871,956 | 3/1975 | Azarowicz | 195/3 H |
| 3,871,957 | 3/1975 | Mohan | 195/3 H |

OTHER PUBLICATIONS

Stanier, Doudoroff, Adelberg, *The Microbial World*, 1970, 310.

*Primary Examiner*—Charles N. Hart
*Assistant Examiner*—Ernest G. Therkorn
*Attorney, Agent, or Firm*—Strauch, Nolan, Neale, Nies & Kurz

[57] ABSTRACT

Methods for the elimination of hydrocarbon contamination from surfaces of the earth, such as fuel oil spills on the ocean or like water surfaces, in which at least one liberated aerosol cloud containing a combination of one or more bacterial microorganisms having the property of degrading the hydrocarbons and a culture medium therefor in particulate form is formed in the atmosphere at a substantial height, typically 50m – 1000m, above an area of hydrocarbon contamination on the surface of the earth in such position and under such conditions that the cloud may settle toward and onto that area, the microorganisms undergoing substantial growth as the cloud settles.

20 Claims, 6 Drawing Figures

AEROSOL DISPERSION OF MICROORGANISMS TO ELIMINATE OIL SLICKS

This application is a continuation-in-part of application Ser. No. 723,622 filed Sept. 14, 1976 as a continuation-in-part of Ser. No. 581,547 filed May 29, 1975, both now abandoned.

This invention is concerned with the elimination of contaminations caused by hydrocarbons, for instance constituents of fuel oil on the surface of the earth, and in particular on water surfaces, such as the ocean and other surface waters.

Different measures have been proposed to confine and to retain oil layers on water surfaces. Floating wall sections and the generation of air bubbles in harbors have for example been suggested. Methods for the removal or collection of oil layers from water surfaces are also known. None of these methods, however, are applicable to the efficient elimination of thin, and particularly very thin, hydrocarbon films from water or land surfaces.

This invention uses present knowledge that hdyrocarbons, in particular fuel oil products on water and land, are biochemically degradable by bacteria. Examples of these microorganisms and their cultures are disclosed in U.S. Pats. to Azarowicz No. 3,769,164; Filosa No. 3,522,147 and Salomone No. 3,728,279; and in the French Pat. to Azarowicz No. 71.20003.

This knowledge of the existence and presence of microorganisms capable of degrading fuel oil-derived hydrocarbons has, however, never been applied to develop specific technical and controlled procedures for the elimination of contaminations caused by hydrocarbons on water and/or land, and these procedures and devices for carrying out the same are major objects of this invention. More specifically therefore the main objects of the invention are to develop relatively uncomplicated, efficient methods for the controlled elimination of contaminations caused by hydrocarbons, on the surface of the earth, microorganisms capable of degrading the hydrocarbons being employed in these methods.

According to the invention, microorganisms, in particular bacteria, capable of degrading hydrocarbons are released into the atmosphere, together with suitable culture media therefor, at a predetermined height above the contaminated area in the form of aerosols in clouds that are heavier than air so that they gradually settle by gravity onto areas of the surface of the earth contaminated by hydrocarbons. Discharging the microorganisms together with culture media in a fine dispersion is advantageous inasmuch as the microorganisms form a finely dispersed aggregation with the particles of the culture medium, and thus are able to remain for longer periods of time in the air. In accordance with laws governing the sedimentation and settling of aerosols and the growth of microorganisms, in particular that of bacteria in culture media, a several-fold increase in bacteria growth is thus accomplished before the microorganisms deposit on the hydrocarbons to be treated. This shift in effective concentration ratios in favor of the microorganisms makes it possible to adequately eliminate contaminating hydrocarbons even in relatively large areas. Within the framework of the invention liquid as well as solid culture media are applicable, the latter being only applicable after being subjected to fine dispersion.

According to the invention there are several approaches for combining the material of the culture medium and the suspension of microorganisms.

It is, for instance, possible to first disperse the material of the culture medium as an aerosol and load it with the microorganisms at the moment of discharge as a cloud to the atmosphere. The term aerosol as used herein refers to a suspension of particles in air or another gas under pressure.

In accord with the invention it is also conceivable to transfer the material of the culture medium and the microorganisms separately to the aerosol state followed by discharge as separate clouds into the atmosphere and subsequently combining the clouds thus formed. In doing so, advantage is taken of differences in physical properties, for instance differences in the rate of sedimentation or settling. The formation of aggregations consisting of the material of the culture medium and microorganisms is facilitated in these cases by, for instance, charging the two aerosols with opposite polarities. These procedures may also be pursued in the following way: a cloud of aerosol particles consisting of the material of the culture medium and showing a low rate of sedimentation may be discharged into the atmosphere followed by the discharge of a separate cloud of aerosol particles consisting of the material of the culture medium and the microorganisms and having a greater sedimentation rate.

The discharge into the atmosphere of clouds of suspensions consisting of only microorganisms is also possible in practicing the invention.

Finally, it is, in the pursuit of these approaches, also possible to release within a preformed cloud aerosol particles consisting of the material of the culture medium and charged with microorganisms or consisting of microorganism suspensions only.

In another approach the procedure may, according to the invention, be executed by transferring a mixture of the material of the culture medium and microorganisms simultaneously to the aerosol state discharging the same into the atmosphere.

While executing, in accordance with the invention, anyone of the variants of the procedure, it is necessary to take into consideration the prevailing sets of natural circumstances, such as wind, humidity and other climate conditions. In any event, it is of utmost importance that the aerosol clouds formed by the aggregation of microorganisms with liquid or solid particles of the culture medium be precipitated effectively on the hydrocarbon films to be eliminated, all this after the number of microorganisms has greatly increased during the slow sedimentation of such clouds as they descend to the contaiminated areas.

If the procedure according to the invention is to be applied to the elimination of very thin, such as monomolecular, layers of hydrocarbons on water surfaces, it is preferable within the framework of the invention to electrically charge the aerosol consisting of the material of the culture medium and the microorganisms. Such an electrical charge must show the opposite polarity from that electrical charge that prevails on the surface of the hydrocarbon film to be treated. This electrical charge of monomolecular layers of hydrocarbon on water surfaces may be readily ascertained as the hydrocarbons usually consist of dipolar molecules which, as is known, are always oriented with the same pole as the surface of the water.

While applying the procedure according to the invention in order to eliminate hydrocarbon contaminations from water surfaces, it is furthermore preferable to select and/or prepare the material of the culture medium in such a way that on, and also under certain circumstances underneath, the surface of the water the coherency between the material of the culture medium and the microorganisms is at least temporarily maintained.

In accord with the invention, bacteria isolated from pumped oil and capable of degrading hydrocarbons are cultivated as strains to be applied in suspensions of microorganisms. It is of particular importance that bacteria capable of degrading hydrocarbons be isolated from oil of different origins and further cultivated. The suspension of microorganisms, to be used in the procedure according to the invention, may be applied as a mixture or selection of these different cultures of bacteria depending upon the type of contamination to be eliminated.

In accord with the invention, culture media or carrier may be employed in the solid and/or the liquid state of aggregation. In doing so it is possible to the greater extent to observe optimum formulation of the culture media, thus assuring optimum growth conditions for the bacteria. Additional physical or chemical manipulations may in the course of culturing techniques be employed also either simultaneously or successively in culture media and/or bacteria, and for instance advantage may be taken of temperature effects.

In accord with the invention it is finally possible to introduce an auxiliary material into the aerosol system in order to provide an optimum, properly timed agglutination or aggregation effect and/or with influence on the surface active properties in the aerosol system.

In accord with the invention, the method may be applied with the help of a particular device for the discharge of an aerosol consisting of the materials of the culture medium and culture microorganisms. Devices suitable for these purposes are disclosed in application Ser. No. 823,327 filed Sept. 17, 1977, now abandoned. A jet system of two components together with an injector for propellent may be mounted in a funnel shaped de Laval type tube or nozzle. The de Laval type nozzle which usually comprises a round orifice followed by a diffusion cone is particularly useful for high velocity discharges. This system is suitable for the acceptance of liquid material of the culture medium or finely dispersed or solid material of the culture medium suspended in liquid as well as for a suspension of microorganisms. The speed of the aerosol is decreased in the funnel-shaped tube which has the advantage of preventing destruction of the highly sensitive bacterial cell walls.

The device may accept a multitude of nozzles respectively for material of the culture media and suspension of microorganisms. With reference to each other the nozzles may be directed at a selected angle. For instance, two jets may be directed at an angle of 45°. The two-component nozzle may have the shape of a slit or a narrow opening. It is also possible to construct the two-component jet with a circularly shaped nozzle.

The propellant-injector jet may in a simple fashion be operated with either pressurized air or any other pressurized gas. For this purpose, for instance, devices for the compression of air are conceivable when the latter is to be employed as propellant. In each of the cases of these variations of the device, stationary as well as mobile accomodations, for instance in an airplane, are possibilities.

If the material of the culture medium and the suspension of microorganisms are accomodated in a mobile container, for instance a rocket, this container may be at its front end equipped with devices for the generation of dynamic air pressure in order to utilize atmospheric air as propellant.

PREFERRED EMBODIMENTS

Figure 1:
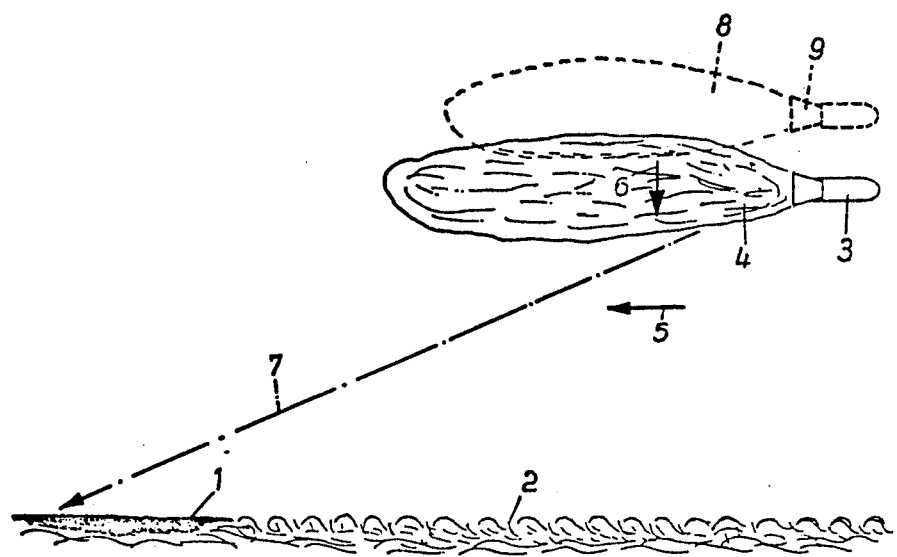
FIG. 1 is a schematic representation for the implementation of the method according to the invention.

In the example of FIG. 1, a thin film 1 consisting of fuel oil, for instance bilge oil, is to be eliminated from the surface of the ocean 2. In this example an aerosol cloud 4 consisting essentially of the material of the culture medium and a suspension of suitable bacteria capable of degrading the hydrocarbons to be eliminated is discharged into the atmosphere from an airplane, helicopter or another airborne object, as by an aerosol generating device 3.

As shown in FIG. 1 the point of discharge for the aerosol cloud 4, as from a helicopter moving at a known speed, usually not more than 100 km/hr. occurs at a predetermined distance from the film 1 of fuel oil to be eliminated. This distance and the altitude at which cloud 4 is discharged are determined by the direction and the speed of the wind indicated by the arrow 5, and the rate of settling or sedimentation of the cloud 4 indicated by the arrow 6 so that cloud 4 settles along the path indicated by dashed arrow 7 to deposit on the film of fuel oil 1.

The factors which determine the location and elevation of the area at which the aerosol cloud is formed are discussed in greater detail below in connection with FIGS. 2, 3 and 4.

In all cases it is important that the position of the area of the formation of the cloud 4 and the contaminated area are so related as to assure retention of the cloud in the atmosphere for a substantial period, i.e. 20–60 hours before it settles on the contaminated area.

Considering that an aerosol droplet which consists of a liquid phase of culture medium and a solid phase of solid culture medium and microorganisms there will occur a growth of microorganisms within the said droplets according to the normal generation rate or generation period of the microorganisms and under the special physical chemical conditions given by the droplets distribution in the aerosol. The growth rate is determined by a mathematical growth function according to which there is an optimum effectiveness multiplication of the microorganisms after some retention time during which the aerosol cloud is held in the atmosphere. Such optimum effectiveness multiplication is given by the fact that the microorgansims within each one of the droplets grow up until they reach an optimum filling condition within the droplet. When having reached such optimum filling condition in each one of the droplets the microorganisms are in very active condition for growing, but thereafter they will more and more pass over in their inactive spore condition. So it is necessary to estimate the optimum growth rate considering the droplet size and the natural generation rate of the used microorganisms. For instance in an aerosol having an average droplet diameter of 4.0 microns and containing microorganisms having a generation rate of seven hours the optimum effectiveness multiplying would be reached within 2.4 days (the multiplying factor would be more than 4000).

The methods of the present invention, by providing for maximum growth and activity of the microorganisms after their release into the atmosphere and prior to contact with the contaminated area, make it possible to treat very large contaminated areas with relatively small quantities of microorganisms which renders the methods mechanically feasible and economically attractive.

Typically 1 ton of bacterial suspension will be dispersed during each fly of the aircraft or helicopter. Further considering that 1 g of this suspension could be enough material for application for 1 m² of the sea surface, 1 ton should be enough for 1 km² of sea surface. Assuming particle sizes in the range of 0.8 to 9 microns (aerodynamic particle diameter) and aerosol particle concentrations of about $10^7$ cm$^{-3}$, 1 ton of suspension yields an aerosol volume of about $10^4$ to $10^5$ m³. After the settling to the sea surface as much as $10^{10}$ particles/m² are delivered to the target to achieve a concentration of about 1 particle for 100 microns² of the sea surface. The aerodynamic particle diameter of an aerosol is the average particle diameter observed over the time period during which the aerosol cloud is present in the atmosphere. Thereby is considered that the diameter of each one of the aerosol particles will change under the influence of the meteorological conditions. E.g. high air-humidity will cause increase in particle diameter etc. But all such conditions can be precalculated by given meteorological data on the base of Stokes-formula.

An aerosol cloud produced by means of the dispersion of 1 ton of bacterial suspension could have a total surface of 2 to 5 m²/g. If the aerosol source is carried by a helicopter or aircraft with a speed of 100 km/h, the source should disperse approximately 17 kg of bacterial suspension or 1700 m³ of aerosol in 1 minute.

The settling rate of aerosol particles of a particular size may be determined by Stokes formula.

It has been determined that to achieve proper settling rates, the average particle diameter will normally be between 3 and 20 microns depending upon the height at which the particles are released.

More specifically a cloud having an average particle size of 3 microns has a settling rate of 0.021 cm/s and will settle from an elevation of 50 m in 2.8 days. If the particle size is 20 microns the settling rate is 1.18 cm/s and the settling time from a height of 1000m is approximately 24 hours.

In the example given above in which the particles have a diameter of 4 microns and the optimum settling period is 2.4 days the particles should be released at a height of approximately 100 m.

The horizontal travel of the aerosol cloud can be compared with the aerosol spread from a stack. The motion of such an aerosol cloud in the atmosphere consists of motion of the air itself and motion of the particles. A continuous stream of aerosol travels with the wind and diffused simultaneously by atmospheric turbulence.

Some approximate formulas can be used for estimating aerosol concentrations in different distances from the source and by influence of different wind speeds. For example a simple formula of Bosanquet can be applied for a given concentration $c_m$ (in g/m³) as a function of the distance x (in m) from the source and the altitude of the source h (in m) as follows:

$$c_m = \frac{Mk}{h^2} f(v_s, v, x/h)$$

in which M is the aerosol amount generated from the source (in g/s), k a correlation factor for wind direction (1), $v_s$ the particle settling velocity (in m/s) and v the wind speed (in m/s).

During the settling period the aerosol cloud is drifted by the wind and the film is drifted by the sea drift. But both of these conditions are calculatable from the known sea conditions and available weather data.

The following examples illustrate practical applications of the methods of the invention.

EXAMPLE I

Figure 2:
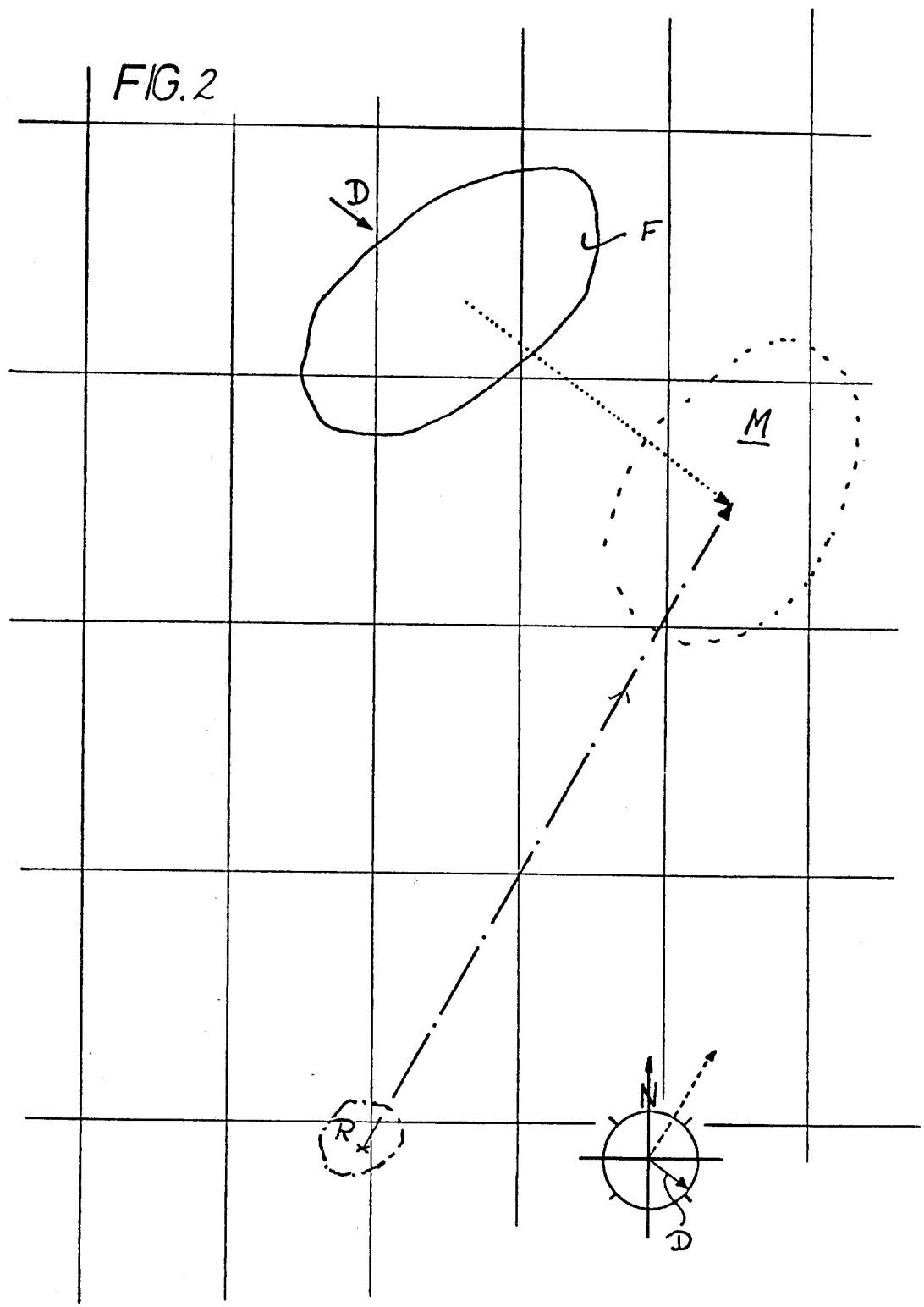
FIGS. 2, 3 and 4 illustrate the effects of atmospheric and surface conditions encountered in the practice of the invention.

A film F of hydrocarbon contamination of the open sea, schematically shown in FIG. 2 is to be eliminated. At this sea district in questions an ocean drift D having a velocity of 2m/sec and coming from North-Western direction of 310° was found. Further there was a wind coming from South-Western direction of 205°. Weather forecast showed that such wind conditions would remain essentially stable for five days.

Under these conditions a decision was made to use *candida lipolytica* as microorganisms and the following solution mixture as culture medium:

10 kg West Texas Devonian Gas Oil 0.5 kg emulgating agens,
0.5 kg Potassium monohydrogen phosphate, 0.5 kg sodium chloride,
0.02 kg magnesium sulfate, 0.005 kg ferric sulfate,
0.5 g copper sulfate, 0.5 g zinc sulfate, 0.5 g manganese sulfate, and
500 kg sea water.

This mixture was stirred to get an emulsion-state.

From such microorganism material and such emulsion an aerosol cloud was produced having an average particle size of 4.0 microns aerodynamic particle diameter. The cloud was released at an altitude of 100 m at the releasing region R, shown in FIG. 2. The releasing region R was found by means of the chart schematically shown by FIG. 2. To determine the region R the initial position of the hydrocarbon film F was introduced into the chart. It was then determined that the settling time of the aerosol cloud should be 2.4 days. Therefore, the drift of the film F within such period of 2.4 days was introduced (dotted line in FIG. 2) to determine the meeting region of the film F and the aerosol cloud to be produced. From this meeting region M the wind drift (dashed and dotted lines in FIG. 2) was drawn rearwardly to find the releasing region R of the aerosol cloud. After releasing the aerosol cloud at an elevation of 100 m the cloud wind drift was checked twice per day, and it was found that the cloud descended entirely onto the sea surface to meet the film F at the region M.

EXAMPLE II

Figure 3:
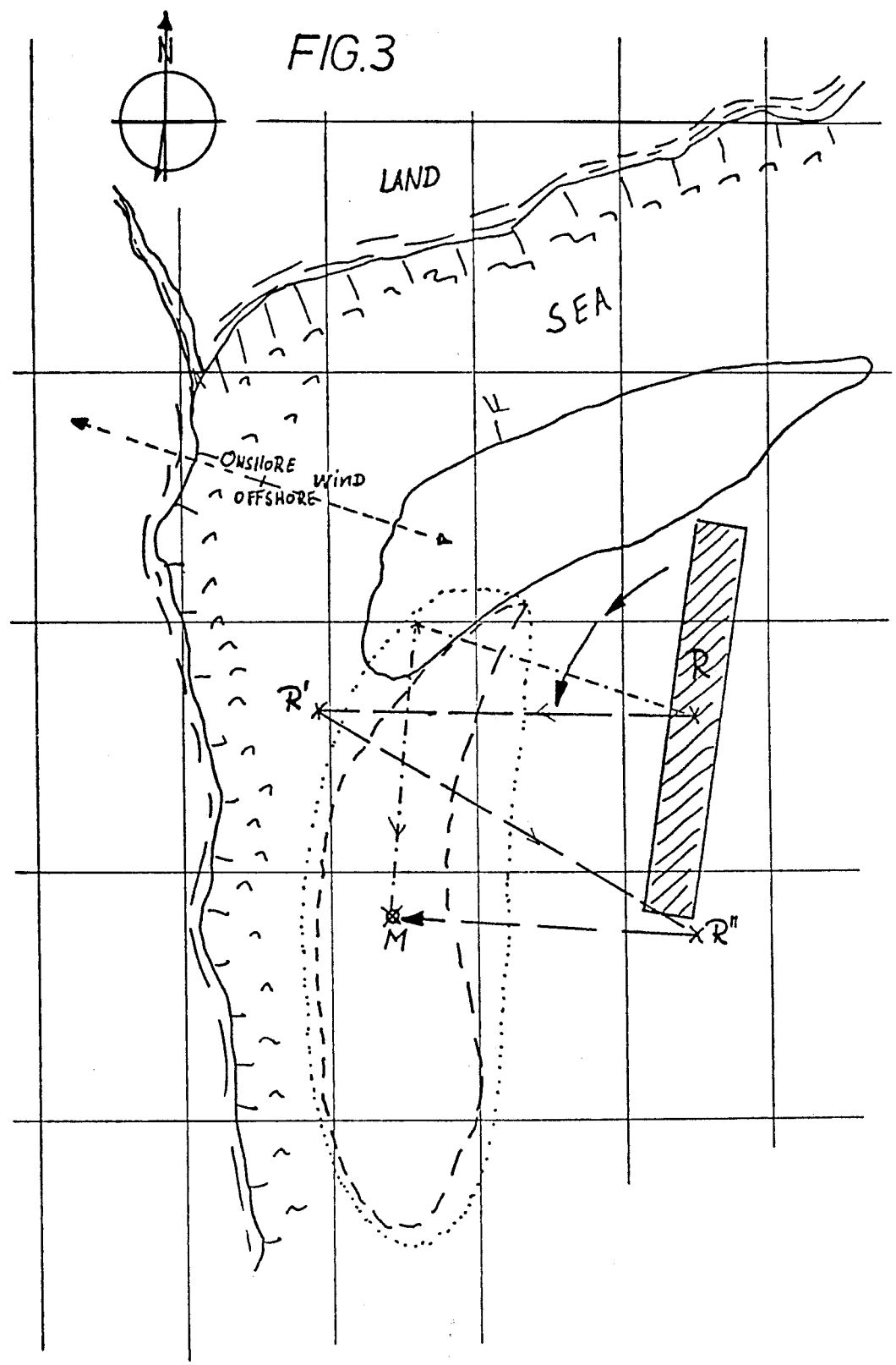
Figure 4:
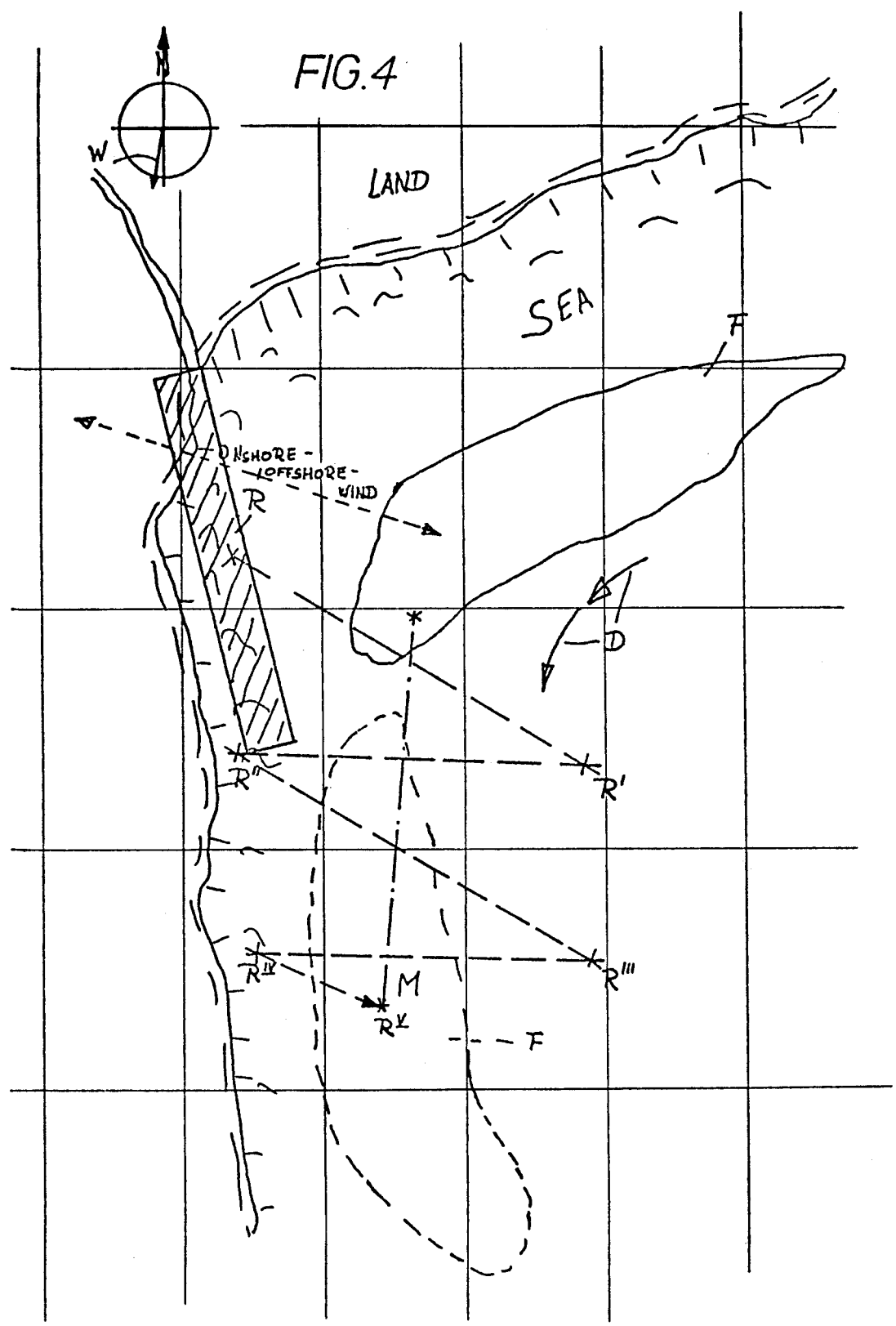

In a bay at a coast a hydrocarbon film F was found in a position shown in FIG. 3. It was further found that in this region an off-shore and on shore wind existed as shown in FIG. 3. Further an ocean drift D was present as shown in FIG. 3. Finally, a wind W coming from the north in a direction of about 5° was present. As the weather forecast showed that these weather conditions would be stable for perhaps 3 days the following decision was made:

Using 300 kg *micrococcus paraffinae* as microorganisms 700 kg culture medium emulsion made of:
West Texas crude oil 50 kg
Emulgating agent 1 kg
Potassium dehydrogen phosphates (ph 7) 5 kg
Residual to 700 kg sea water.

It was determined that the desired settling period of the cloud was 38 hours. To obtain this period it was determined that the cloud should be released at an elevation of 200 m.

The position of the releasing area was calculated by estimating the film drift according to the areas D during 38 hours to obtain the metting area of the film and the cloud. From such meeting area the wind drift (dotted line) and the onshore-offshore wind influence (dashed and dotted lines) during 38 hours were introduced in the chart the releasing area R.

At first the released aerosol cloud was drifted under the influence of the northern wind and the onshore wind to a region which is shown in FIG. 3 by the point R'. Under the influence of the northern wind and the offshore wind the cloud was then drifted to a region shown by R".

From the region R" the cloud drifted under the influence of the onshore wind of the next day and the northern wind to the meeting region M, but during such 38 hours travel time the cloud has only descended for about 100 m, so that it remained at an elevation or altitude of 100 m. In order to join the cloud with the hydrocarbon film, an artificial light rain was produced by spraying out sea water from helicopters above the aerosol cloud. The average particle size of such rain was about 50 microns aerodynamic particle diameter. The aerosol cloud was washed out and joined with the hydrocarbon film within about half an hour.

EXAMPLE III

Under the same conditions as mentioned in example II the decision was made to use the same microorganisms and the same culture medium material, but releasing the aerosol cloud near the coast in the early morning when the offshore wind began to develop and to use a retention time of the cloud in the atmosphere of 52 hours. In this case a film drift was found as shown in FIG. 4 and the northern wind and offshore-onshore-wind influence was such that when introducing in the chart the releasing area R was found. The elevation or altitude of releasing was 100 m and the average particle size 4.0 microns aerodynamic particle diameter. The cloud at first drifted offshore to a region R'. Thereafter an onshore drift to R" occured. Thereafter the cloud had a second offshore drift to R'". After this second offshore drift occured a second onshore drift and finally a last offshore drift to the meeting area.

Although the descending time for such a cloud would theoretically be 58 hours it has been found that the cloud when over sea and at a relatively low altitude takes over substantially amounts of water and so the droplets begin to increase and the settling velocity is increased. Thus the cloud during its last onshore drift from $R'''$ to $R^{IV}$ sweeps over the film F, so that its lower protion contacts the film, and the particles in the lower portion of the cloud join with the hydrocarbon film F. This first sweeping over is due to the fact that the particle size of the cloud are within a range in a statistic probability. Such particles size range is further broadened by the fact that the particles take over moisture from the air over sea and thereby increase in their particle size or aerodynamic particle diameter. As the coarser particles have greater settling velocity the thickness of the cloud is increased so that during its drift between $R'''$ to $R^{IV}$ the lower surface of the cloud is practically in contact with the sea surface and is progressively taken over by the sea surface and the film. When the cloud returns from $R^{IV}$ to $R^V$ it is finally taken over by the film F and the sea surface around the film.

EXAMPLE IV

As the microorganisms in question have no anti toxic character and they do not affect the environment by causing corrosion or other undesired effects, the process according to the present invention can be used to treat regions in which hydrocarbon film contaminations can often occur, such as in harbor regions, principal shipping lanes, or offshore oil wells. In the present example a harbor region is to be treated to eliminate hydrocarbon film contaminations on the harbor water surface the harbor plant surfaces, on quays and docks and other harbor portions as well as on ships lying in the harbor.

As in examples II and III the meteorological wind conditions and if needed the onshore and offshore wind conditions have to be taken into account to calculate the releasing region for the aerosol cloud.

In a typical case 100 kg *Candia utilis* are used as microorganisms. 300 kg culture medium material is used, being a fine dispersion or emulsion of 5 kg crude oil in sea water. Alternatively 150 kg hydrocarbon contamination water from a harbor basin and 150 l kg fresh sea water and 0.5 kg emulgating agent can be intensively mixed to form a fine dispersion of hydrocarbon.

Such microorganisms and culture medium are transferred into an aerosol cloud in an elevation of 200 meters, the cloud having an average particle size of 5 microns aerodynamic particle diameter. Such a cloud may be released daily, preferably in the early morning. The releasing region of the cloud has to be calculated every day by means of the daily weather forecast. Every night for instance about midnight, light rain is produced in an elevation of 50 m above the harbor region by spraying fresh sea water. Such light rain should have an average particle size of 50 microns aerodynamic particle diameter. By such processing all residual aerosol having an elevation lower than 50 m is washed out and brought into contact with the surfaces to be treated. Such washing out has the effect that during the following day practically no further sedimentation of aerosol particles occurs in the harbor region. Additionally by such washing out, the atmosphere above the harbor region can be cleared of dust and smoke.

Additionally, during hot periods, an aerosol cloud of fresh sea water can be released daily at noon or in the early afternoon at an elevation of 200 m above the harbor region or above the aerosol cloud released at the early morning. The additional cloud refreshes the microorganisms and culture medium in the previously released cloud. Such additional aerosol cloud of fresh air water should have an average particle size of 6.0 microns aerodynamic particle diameter so that it has a greater settling velocity than the first cloud. Accordingly, the refreshing cloud sinks down into the prior released aerosol cloud, to restore the particles of the latter to their original size. If necessary two or three refreshing aerosol clouds can be released at different altitudes or elevations. In order to avoid an excess concentration of salt the refreshing clouds can also be produced by fresh water.

If it is desired to accelerate the settling of the aerosol cloud, a "washout" process may be used. This means that the aerosol cloud can be set out such that this cloud and the film to be treated are drifted by the above mentioned conditions in a position above each other and in such mutual position of the cloud artificial rain will be produced above the cloud, for instance by spraying downwardly sea water. For such spraying conventional sprayers may be used, to produce relatively large droplets which fall like rain drops. The aerosol is captured by such droplets and is drawn onto the film to be treated.

When using microorganisms material and culture medium material which contain water, adequate steps can be undertaken to avoid drying out during settling periods. An aerosol cloud during its travel from the development region to the meeting with film region can be regenerated or refreshed by sea water aerosol clouds which can be generated from time to time around or in the microorganism and culture medium aerosol cloud. Of course a treatment according to the present invention is positively controlled and supervised. The aerosol cloud movements are preferably supervised or watched over by radar or infrared radiation since, normally, the aerosol clouds in question are not visible to the unaided eye.

In all cases the composition of the fuel oil film to be cleaned up is determined from specific analysis or information available otherwise. The bacteria used in the aerosol cloud is selected from the point of view of their specific effects in the degradation of the particle type of fuel oil. The material of the culture medium used in the aerosol cloud in turn, is selected from the point of view of offering the best possible growth conditions for the selected bacteria.

During the settling time, the bacteria in the cloud increases several-fold in number in the material of the culture medium so that a considerable shift in concentration in favor of the bacteria takes place. This results in a specific activation of the bacteria used for the attack of the fuel oil and the degradation of this fuel oil.

Usually the particles of the culture medium aerosol leave the aerosol generator already charged with the bacteria, the number of which will increase as the cloud falls. In accord with the invention it is, however, also possible to generate two separate aerosol clouds one above the other at different altitudes. Of the two, the upper aerosol cloud 8 shown in FIG. 1 by dashes is usually liberated from an additional aerosol generator 9. This aerosol cloud 8 should have a greater rate of settling than the lower aerosol cloud 4. In this way it is for instance possible to charge the upper more rapidly settling aerosol cloud 8 with bacteria suspension and the lower more slowly settling aerosol cloud 4 with the material of the culture medium or vice versa. The formation of the two aerosol clouds 4 and 8 may also be used in the following way: the two clouds may allow for a two-step combination of material of the culture medium and bacterial suspension; one aerosol cloud consisting of the material of the culture medium and the bacterial suspension is united with a second aerosol cloud of material of the culture medium. At the time the clouds merge, a considerable increase in the number of bacteria has taken place already in the material of the culture medium in the first cloud.

Since the upper cloud settles more rapidly the two clouds will descend at different rates of speed with the upper cloud gradually merging into the lower and eventually the two descend as one onto the polluted area with the bacteria and culture medium in the first cloud.

The effective combination of aerosol particles of clouds directed at each other, either immediately or soon after liberation or also after more prolonged periods of time after liberation, may be intensified by charging the respective aerosol clouds with opposite electrical polarities.

Considerable improvement of the bacteria grown on the material of the culture medium may be attained by properly adjusting the material of the culture media on which the bacteria are maintained and are aimed as aerosol at the oil film 1. This adjustment aims at maintaining the bacteria in active form while being deposited on the surface of water and even while in contact with either fresh water or salt water. Since thin films of oil, for the elimination which, according to the invention, the method is of particular importance, are frequently disrupted by waves and may be partially drawn below the surface of water for shorter or longer periods of time, it is advisable to follow the procedure indicated in order to maintain even under water the activity of the bacteria capable of degrading hydrocarbons. These approaches offer the added advantage that aerosols consisting of culture medium and bacteria having been deposited on the surfaces of the water outside of the actual oil film are immediately available as the oil film spreads and covers areas of the water surface pretreated in this fashion.

Figure 5:
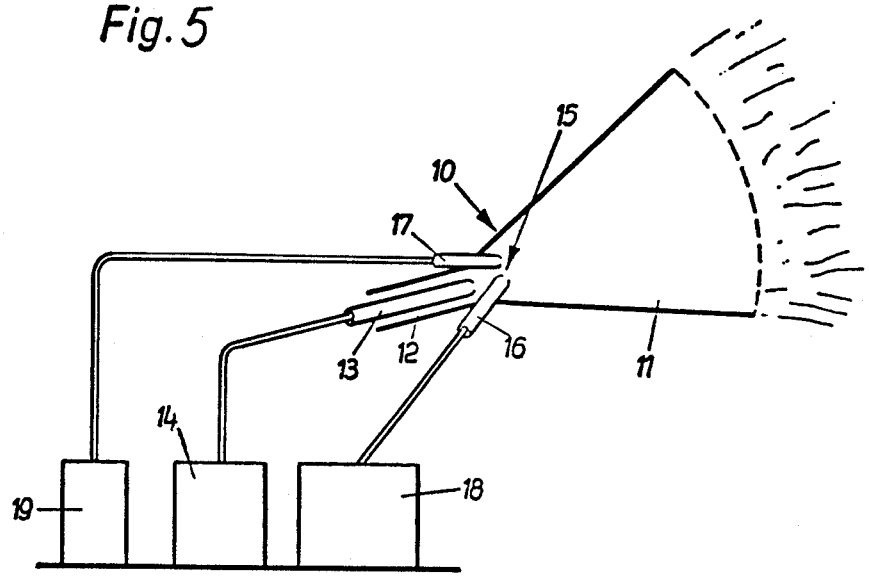
FIG. 5 is a schematic representation for one form of device for practicing the invention.

The device 10 for the generation of a mixed aerosol of material of the culture medium and a bacterial suspension, shown in FIG. 5 for example, is in essence stationary. It may, however, as the need arises be equipped with a mobile vehicle in order to be driven to the one or other location for application.

The device may, for instance, be mounted on ships or other vehicles. This device consists in essence of a funnel-shaped de Laval type discharge 11 thee narrower rear orifice end of which 12 accomodates an injection jet 13 for the propellant. Injection jet 13 is connected to a supply container 14 of pressurized air. For reasons of simplicity the usual necessary shutoff and reducing valve are not shown. Ahead of the injection jet 13 a two-component jet system 15 enters the larger flaring part of the funnel-shaped tube. This two-component jet 15 consists of one jet 16 for the material of the culture medium and one jet 17 for the bacterial suspension which consists of the selected bacteria in a suitable vehicle which may be the culture medium. The two jets 16 and 17 of the two-component jet system are directed so that the jets intersect at an angle, for instance an angle of approximately 45° and they may discharge the respective material due to the aspiration effect of the pressurized air jet. Also sources of pressurized gas may be provided in containers 18 and 19.

The jet 16 attached to the container for the culture medium 18 must be adapted from case to case to the type of material used in the culture medium. It may for instance be a jet suitable for powdered and finely dispersed solid material. Accordingly, the jet 16 may also be one for suspensions of culture media or one for liquid culture media. Therefore, the jet 16 may, to serve this purpose best, be exchangable from case to case. The jet 17 is similar and attached to the container 19 for bacterial suspensions.

For the purpose of operation, the device 10 must first be brought to the desired location of application and be placed in proper position according to the discharge direction of the aerosol cloud. Thereafter the appropriate pressure for the propellant must be chosen and the propellant valve leading to jet 3 must be opened. After opening the valves controlling the jets 16 and 17 a stable aerosol will be formed within tube 11 wherein the culture medium added through the jet 16 and the bacterial suspension provided through jet 17 undergo intense whirling and mixing.

Figure 6:
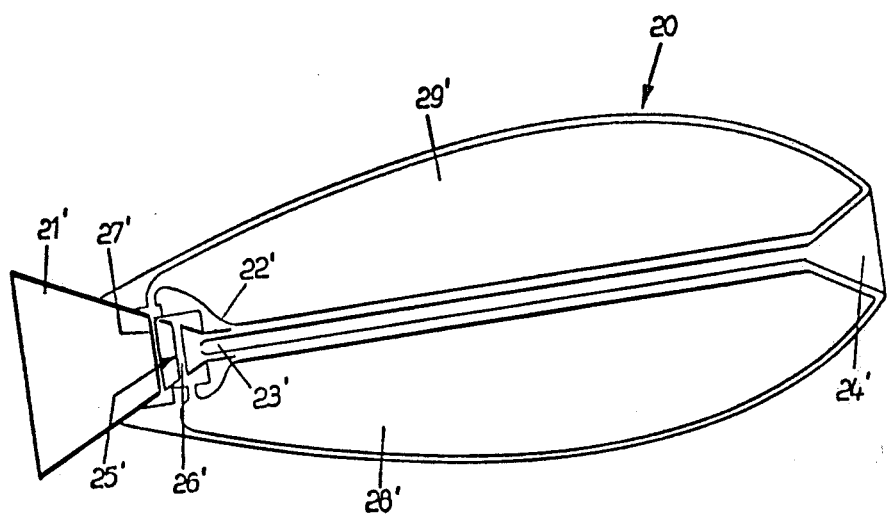
FIG. 6 is a schematic representation of a second device for practicing the invention.

FIG. 6 shows a mobile container 20 which in itself may be operated as an airborne vehicle, for instance a rocket, or it may be modified in such a way that it may be a tank attached to an airplane or helicopter. This container 20 contains at its rear end a funnel-shaped de Laval type discharge tube 21 in the rear portion 22 of which the propellant jet 23 is accommodated. In this case atmosphere air serves as propellant. For this purpose the container carries at its front end a suction device 24 with the help of which the pressure is increased to a point adequate for the operation of the injection jet 23. The interior of the container 20 contains a chamber 28 to accommodate the material of the culture medium and a chamber 29 for the accommodation of the bacterial suspension. The two-component jet system 25 serves to discharge these two materials in the funnel-shaped tube. The two-component jet system 25 consists of two circular slit type jets 26 and 27 one mounted after the other. The circular slit type jet 26 is attached to chamber 28 and the circular slit type jet 27 to chamber 29. Upon movement of the container 20 through air and upon opening the connection between the suction device 24 and the injector jet 23 material of the culture medium and bacterial suspension are advanced via the circular slit type jets 26 and 27 to the discharge tube. In the tube the two components are intensely mixed and whirled for the formation of a stable aerosol. In doing so bacteria are effectively deposited on the particles of the culture medium. In this way the bacteria have the location and opportunity to greatly increase in numbers during the time of sedimentation of the aerosol cloud formed in and discharged into the atmosphere by the funnel-shaped tube 21. Upon combination with the fuel oil film or similar layers of contamination the bacteria may immediately begin with the intensive degradation of the hydrocarbons.

Instead of using the pressurized air containers of FIG. 6 or the suction device of FIG. 6, other similar devices for example, as disclosed in copending application Ser. No. 823,327 may be used.

The invention utilizes known microorganisms and known cultures therefor. These comprise bacteria, actinomycetes, yeasts and myzelum forming fungi which have gone through mutations in cultures and are capable of degrading petroleum and hydrocarbon oil products. Exemplary microorganisms of these groups in addition to those mentioned above are Arthrobacter, Nacardia, *Candida tropicalis* and Cladosporium.

The characteristics of these microorganisms and the cultures in which they are developed to attain qualities of hydrocarbon oil degration are disclosed in U.S. Pat. Nos. 3,769,164 and 3,522,147 and French Pat. No. 71.20003 to which reference is made for further information as to available microorganisms and cultures for the purpose at hand.

A growth medium particularly advantageous for large scale production of these microorganisms comprises the following proportionate mixture:

Sea Water:15 ml
Crude Oil:100 mg
Yeast Extract:100 ug
$K_2HPO_4$:0.056 nm
$(NH_4)_2SO_4$:7.6 nm The foregoing medium with the microorganism mixed into it is held at 34° C., and multiplication proceeds rapidly. These microorganisms may be transferred to fertile agar where growth continues and through selection strains can be isolated having specific capabilities to degrade different oils. The agar carrying the microorganisms may be dried and stored, and when used may be pulverized, as for atomization and inclusion in the aerosol clouds according to the invention.

In forming the aerosol clouds according to the invention (see FIG. 2) the microorganism and culture medium particles are uniformly dispersed in a cloud which absorbs moisture from the atmosphere and develops a growth culture environment wherein the microorganisms multiply. The particle size range is preferably about 3 to 20 microns, selected to achieve the desired rate of settling. In these particle sizes of the materials here involved, the larger particles are the heavier. When two clouds are produced, as shown in FIG. 1 the upper cloud will have larger particle sizes and will settle faster, the size ratio being selected to time the gradual merging of the two clouds together.

In a practical example the foregoing range of particle sizes enables the formation of clouds that may gradually settle toward the target oil area over a period of two to four days.

The determination of particle size and the resultant tempo of settling can be controlled by suitable adjustment of the aerosol generator, and this can be suited to the various tasks.

Using the system of FIG. 3 and dispensing about 4000 grams of lyophilic bacteria in a culture medium, crushed to particle size within the above range, an aerosol trail five kilometers in length, may be formed which after about one day develops into a cloud one kilometer wide and one kilometer high. This cloud after a few days in the atmosphere attains a slightly negative electrical charge.

The invention in its preferred embodiment attains the unusual result of destroying and removing thin films of oil from water surfaces. It is believed that the combined atomized microorganisms and culture medium in coming in contact with the oil film destroy the electrostatic conditions present in that film. The oil tends to form small droplets due to its own surface tension and these droplets contain the deposited particles so that the oil therein is particularly vulnerable to attack by the microorganisms.

The oil areas to be cleared up are usually quite large and so are the clouds of particles so that pinpoint accuracy is not essential, probably not more than refinements of crop dusting techniques. The activity of the microorganisms continues beyond this initially contacted oil regions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for the reduction or elimination of hydrocarbon contamination from an area on the surface of the earth which comprises selecting a bacterial microorganism or mixture of microorganisms from a known group having the property of degrading the hydrocarbon contaminating the surface area, selecting a growth culture medium therefor and forming at least one liberated heavier than air aerosol cloud containing a combination of said selected microorganism or microorganisms and said selected growth culture medium, both in fine particulate state, in the atmosphere above said area of hydrocarbon contamination in such calculated position that the cloud settles gradually over a predetermined time toward and onto said area, said predetermined time being sufficient so that a substantial increase in the number of microorganisms occurs before said cloud settles on said area.

2. A method according to claim 1 wherein the culture medium is in the form of a liquid or a fine dispersion of solids.

3. A method according to claim 1 wherein the culture medium is loaded with microorganism material upon liberation to the atmosphere.

4. A method according to claim 1 wherein the culture medium and a microorganism material suspension are separately discharged into the atmosphere in the form of aerosol clouds that are subsequently combined prior to reaching said area.

5. A method according to claim 4 wherein said clouds are discharged at different levels one above the other and the upper of said clouds is of such characteristics that it settles sufficiently faster than the other that they combine as they move toward the earth.

6. A method according to claim 4, wherein the two aerosol clouds are electrically charged with opposite polarities.

7. A method according to claim 4, wherein a first cloud of slowly sedimenting aerosol particles of the culture medium is discharged to the atmosphere followed by the discharge above it of a cloud of more rapidly sedimenting aerosol particles of a medium loaded with the microorganisms.

8. A method according to claim 4, wherein aerosol particles of the culture medium loaded with microorganisms are discharged to the atmosphere within a preformed cloud of aerosol particles consisting essentially of the material of the culture medium.

9. A method according to claim 1, wherein a mixture consisting of the culture medium and microorganisms or suspensions of microorganisms is transformed to the aerosol state and discharged to the atmosphere.

10. A method according to claim 1 wherein said area is a very thin, substantially monomolecular layer of hydrocarbons on water surfaces and the aerosol cloud is electrically charged so that its polarity is of the opposite sign from that of the electric charge on the surface of the hydrocarbon layer.

11. A method according to claim 1, wherein the culture medium is so selected or prepared that on and under the surface of water coherency between the culture medium and the microorganism is at least temporarily maintained.

12. A method according to claim 1 wherein the microorganism or microorganisms are obtained by isolating bacteria capable of degrading hydrocarbons from oil pumped from the earth, further cultivated in strains, and stored as suspensions of the microorganisms.

13. A method according to claim 12, wherein bacteria capable of degrading hydrocarbons are isolated from oils of different geographical origin, and further cultivated and formed into suspensions and the suspensions of the microorganisms are combined as mixtures of specific selections with the culture medium in accord with the type of contamination to be eliminated.

14. A method according to claim 1 wherein the culture medium and the microorganisms are combined, dried to solid state and pulverized to particulate form prior to incorporation in said cloud.

15. A method according to claim 1 wherein additional physical or chemical manipulations are simultaneously or successively applied to the culture media or to the bacteria, consisting for instance in effects brought about by changes in the temperature.

16. A method according to claim 1 wherein an auxilliary material is introduced in the aerosol system for the purpose of generating an optimum and properly timed agglutination or aggregation effect and/or to influence surface active properties in the aerosol system.

17. A method according to claim 1 including the preliminary step of ascertaining by test the type of hydrocarbon in said area, selecting from a series of different known bacterial microorganism strains a bacterial microorganism strain or strains that has optimum degrading action with respect to the ascertained hydrocarbon, and providing said selected strain or strains as the bacterial microorganism in said cloud.

18. The method defined in claim 1 wherein said cloud is discharged from an aerial vehicle moving at a known speed and located at a measured distance and known altitude with respect to said area to determine said position of the cloud prior to settling.

19. The method defined in claim 18, wherein said microorganisms and culture medium are present in said cloud in predetermined particle sizes in the range of 3 to 20 microns.

20. The method defined in claim 1 wherein said cloud is discharged from an aerial vehicle moving at a speed not substantially greater than 100 km/min. and at an elevation of from about 50 m to 1000 m.

* * * * *

UNITED STATES PATENT OFFICE
CERTIFICATE OF CORRECTION

Patent No. 4,136,024        Dated January 23, 1979

Inventor(s) Karl Bisa et al

It is certified that error appears in the above-identified patent and that said Letters Patent are hereby corrected as shown below:

Column 2, line 40, after "state" insert --and--.

Column 3, line 42, change "of" to --for--.

Column 6, line 1, change "diffused" to --diffuses--.

Column 6, line 12, change the formula to "$C_m = Mk/h^2 f(Vs/V, x/h)$".

Column 8, line 8, change "size" to --sizes--.

Column 8, line 42, after "150" delete "1".

Column 10, line 51, change "thee" to --the--.

Column 12, line 30, change "Fig. 2" to --Fig. 1--.

Column 14, line 25 (claim 13) change "and" to --are--.

Signed and Sealed this

Fifteenth Day of May 1979

[SEAL]

Attest:

RUTH C. MASON
*Attesting Officer*

DONALD W. BANNER
*Commissioner of Patents and Trademarks*